United States Patent
Muske et al.

(10) Patent No.: US 9,384,017 B2
(45) Date of Patent: Jul. 5, 2016

(54) SYSTEM AND METHOD TO PROVIDE GROUPING OF WARNINGS GENERATED DURING STATIC ANALYSIS

(71) Applicant: Tata Consultancy Services Limited, Mumbai (IN)

(72) Inventors: Tukaram B Muske, Pune (IN); Ankit Baid, Pune (IN); Tushar Rohidas Sanas, Pune (IN)

(73) Assignee: Tata Consultancy Services Limited (IN)

( * ) Notice: Subject to any disclaimer, the term of this patent is extended or adjusted under 35 U.S.C. 154(b) by 223 days.

(21) Appl. No.: 14/184,530

(22) Filed: Feb. 19, 2014

(65) Prior Publication Data
US 2014/0244645 A1  Aug. 28, 2014

(30) Foreign Application Priority Data
Feb. 28, 2013  (IN) ............................ 596/MUM/2013

(51) Int. Cl.
*G06F 17/30* (2006.01)
*G06F 9/445* (2006.01)
*G06F 11/36* (2006.01)

(52) U.S. Cl.
CPC ........ *G06F 9/44589* (2013.01); *G06F 11/3604* (2013.01)

(58) Field of Classification Search
CPC .......... G06F 11/3604; G06F 17/30598; G06F 9/44589
See application file for complete search history.

(56) References Cited

U.S. PATENT DOCUMENTS

| | | | | |
|---|---|---|---|---|
| 4,720,778 A | * | 1/1988 | Hall | G06F 11/364 714/38.12 |
| 5,764,883 A | * | 6/1998 | Satterfield | G06F 11/3604 714/38.1 |
| 2003/0131284 A1 | * | 7/2003 | Flanagan | G06F 8/75 714/38.1 |
| 2007/0016894 A1 | * | 1/2007 | Sreedhar | G06F 11/3608 717/131 |
| 2007/0128899 A1 | * | 6/2007 | Mayer | G06F 9/4406 439/152 |

(Continued)

FOREIGN PATENT DOCUMENTS

JP    2006/226545 A    8/2006

OTHER PUBLICATIONS

Sunghun Kim et al., "Which Warnings Should I Fix First?", ESEC-FSE'07, Sep. 3-7, 2007, (10 pages).

(Continued)

*Primary Examiner* — Shiow-Jy Fan
(74) *Attorney, Agent, or Firm* — Finnegan, Henderson, Farabow, Garrett & Dunner, LLP

(57) ABSTRACT

The present disclosure generally relates to warnings generated based on static analysis and, more particularly, to grouping warnings generated based on static analysis. In one embodiment, a method for grouping a plurality of warnings generated based on a static analysis of an application program is provided. The method may include analyzing, by one or more processors using programmed instructions stored in a memory, the application program to generate the plurality of warnings; identifying, by the one or more processors, one or more similar warnings based on the plurality of warnings, the similar warnings having structurally and semantically similar expressions of interest (EOI); and generating, by the one or more processors, one or more groups of warnings based on the plurality of warnings, the one or more groups of warning including one or more of corresponding identified similar warnings.

6 Claims, 5 Drawing Sheets

(56) References Cited

U.S. PATENT DOCUMENTS

| | | | | |
|---|---|---|---|---|
| 2008/0229286 A1* | 9/2008 | Kahlon | ............... | G06F 11/3604 717/126 |
| 2010/0325620 A1* | 12/2010 | Rohde | ................. | G06F 9/44589 717/154 |
| 2011/0067009 A1* | 3/2011 | Hosokawa | ................ | G06F 8/77 717/132 |
| 2011/0276843 A1 | 11/2011 | Echevarria et al. | | |
| 2012/0159457 A1* | 6/2012 | Addison | ................... | G06F 8/43 717/131 |
| 2012/0222009 A1 | 8/2012 | Ayewah et al. | | |

OTHER PUBLICATIONS

IBM, ""Unstable Code" Higher Level Compiler Messages Classification," IP.com No. IPCOM000174110D, Aug. 26, 2008 (2 pages).

* cited by examiner

SYSTEM AND METHOD TO PROVIDE GROUPING OF WARNINGS GENERATED DURING STATIC ANALYSIS

PRIORITY CLAIM

This U.S. patent application claims priority under 35 U.S.C. §119 to India Application No. 596/MUM/2013, filed Feb. 28, 2013. The aforementioned application is incorporated herein by reference in its entirety.

TECHNICAL FIELD

The present disclosure generally relates to warnings generated based on static analysis and, more particularly, to grouping warnings generated based on static analysis.

BACKGROUND

The use of static analysis in validation and verification of safety-critical software applications becomes more important. However, static analysis of the software applications may result in many falsely reported warnings, commonly referred to as false positives. All the warnings generated by the static analysis may thus require a manual review in order to check if the warnings are safe or unsafe. Manually reviewing a large number of warnings is time consuming and associated with high cost. The large number of warnings is a result of using abstractions and/or conscious design decisions such as excluding array handling or performing analysis intra-procedurally. Additionally, the inability of the static analysis for determining actual values that a variable can take at run-time may lead to a high number of warnings generated.

Currently, a user analyzing or reviewing the warnings generated by static analysis has to review each of the warnings individually. Some existing techniques, such as abstract interpretation, difference bound matrix, and model-checking, may attempt to make the static analysis more precise. However, the existing techniques may still generate a large number of warnings, and may thus fail to reduce the manual review efforts required to analyze the warnings.

Moreover, other existing techniques may provide groupings of warnings based on severity or priority of the warnings. But these techniques fail to reduce the review efforts of the warnings.

SUMMARY

This summary is provided to introduce aspects related to systems and methods for grouping warnings generated during static analysis, and the aspects are further described below in the detailed description. This summary is not intended to identify essential features of the claimed subject matter nor is it intended for use in determining or limiting the scope of the claimed subject matter.

In one embodiment, a method for grouping a plurality of warnings generated based on a static analysis of an application program is provided. The method may include analyzing, by one or more processors using programmed instructions stored in a memory, the application program to generate the plurality of warnings; identifying, by the one or more processors, one or more similar warnings based on the plurality of warnings, the similar warnings having structurally and semantically similar expressions of interest (EOI); and generating, by the one or more processors, one or more groups of warnings based on the plurality of warnings, the one or more groups of warning including one or more of corresponding identified similar warnings.

In one embodiment, a system for grouping a plurality of warnings generated based on a static analysis of an application program is provided. The system may include one or more processors and a memory storing processor-executable instructions that, when executed by the one or more processors, configure the one or more processors to: analyze the application program to generate the plurality of warnings; identify one or more similar warnings based on the plurality of warnings, the similar warnings having structurally and semantically similar expressions of interest (EOI); and generate one or more groups of warnings based on the plurality of warnings, the one or more groups of warning including one or more of corresponding identified similar warnings.

In one embodiment, a system for grouping a plurality of warnings generated based on a static analysis of an application program is provided. The system may include one or more processors and a memory storing processor-executable instructions that, when executed by the one or more processors, configure the one or more processors to: analyze the application program to generate the plurality of warnings; identify one or more similar warnings based on the plurality of warnings, expression of interest (EOI) of the similar warnings have same operators appearing in same order, and variables in the EOI of the similar warnings get values from same modification points in the application program; and generate one or more groups of warnings based on the plurality of warnings, the one or more groups of warnings including one or more of corresponding identified similar warnings.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

In the present disclosure, systems and methods for grouping warnings generated based on static analysis of an application program are described. Initially, the warnings may be generated based on analysis of the application program. The warnings generated may be further classified or grouped based on a similarity in the warnings. Various constraints may be required to group the warnings on the basis of similarity. The constraints may include, for example, structural and semantic similarity associated with expressions of interest (EOIs) of the warnings. The warnings may be reachable from one another in forward or backward flows. Variables from the EOIs of the warnings may not be modified between the program points of the warnings, and values that are evaluated by the EOI of at least one warning of the similar warnings may comprise values from the EOI associated with other warnings of the similar warnings.

Further, a representative warning may be determined from a group of the warnings such that review of the representative warning may represent review of other warnings in the group. If the representative warning of the group is found to be safe, the other warnings of the same group may also be found to be safe, and thus may not require review. However, if the representative warning is found unsafe, the other warnings in the group may still require individual review.

In some embodiments, the warnings may be grouped if the EOIs of the warnings have the same operators that appear in the same order and if the EOI variables related by their positions in the EOIs obtain values from the same modification points. In such a group, one of the warnings may be reviewed based on the values provided by the modification points of the EOI variables. If the warning reviewed is safe, the other warnings from the same group may also be safe and thus may not require separate review. If the warning reviewed is unsafe, then each warning in the group may require individual review.

While aspects of the described systems and methods for grouping warnings generated based on static analysis may be implemented in any number of different computing systems, environments, and/or configurations, the embodiments are described in the context of the following exemplary system.

Figure 1:
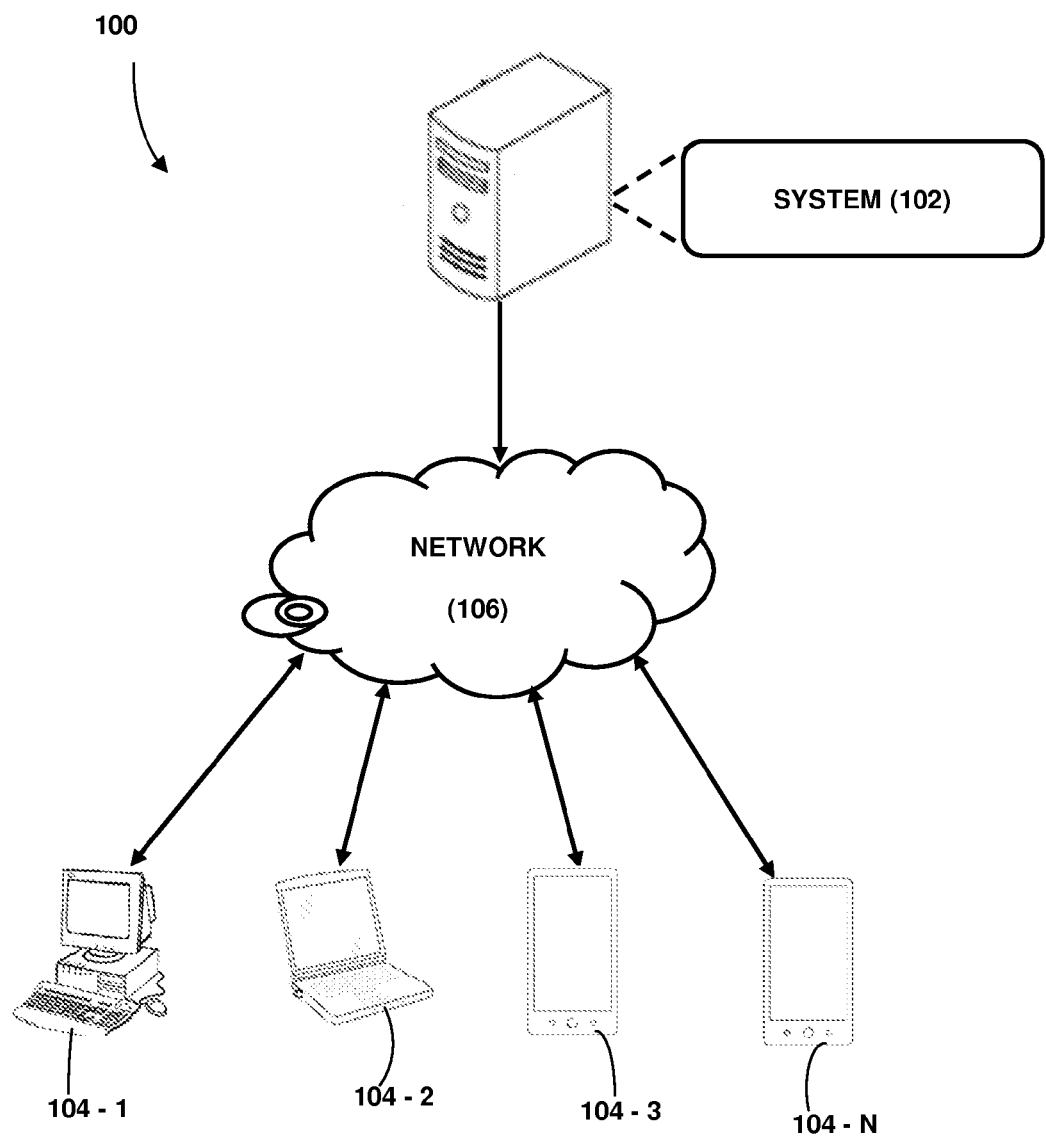
FIG. 1 illustrates an exemplary network environment including a system for grouping warnings generated based on static analysis, in accordance with an embodiment of the present subject matter.

FIG. 1 illustrates an exemplary network environment 100 including a system 102 for grouping one or more warnings generated based on static analysis of an application program, in accordance with an embodiment of the present subject matter. In one embodiment, the system 102 may group the warnings generated based on the static analysis. In one embodiment, the system 102 may analyze the application program to generate warnings. The warnings may be identified based on similarity of the warnings. The identified warnings may be referred to as similar warnings and the terms "similar warnings" and "warnings based on similarity" are interchangeable. Further, one or more groups of the warnings may be formed. Each group of the one or more groups may comprise similar warnings. Further, the system 102 may determine a representative warning from each group of the warnings, such that the warnings in each group other than the corresponding representative warning of the same group may follow a review judgment of the representative warning and a review of the representative warning in a group may represent the review of the warnings other than the representative warning in the same group.

In some embodiments, with respect to the warnings generated, similar warnings may be identified. The EOIs of the similar warnings identified may have same operators that appear in the same order and the EOI variables from the EOI of the similar warnings may obtain values from the same modification points. The EOI variables may be related by their positions in the EOI. Further, the system 102 may form one or more groups of the warnings and each group of the one or more groups may comprise similar warnings. A review of a warning of the similar warnings in each group may represent the review of the similar warnings other than the warning reviewed in the same group. The warning may be reviewed based on the values provided to the EOI variables by their modification points. If the warning is safe based on the review, the similar warnings other than the reviewed warning may also be safe, and thus may not require individual review.

If the warning is unsafe based on the review, the similar warnings in the same group may require e individual review.

Although the present subject matter is explained considering that the system 102 is implemented on a server, it is appreciated that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 may be communicatively coupled to the system 102 through a network 106.

With reference to FIG. 1, in some embodiments, the network 106 may be a wireless network, a wired network, or a combination thereof. The network 106 may be implemented as one of the different types of networks, such as intranet, local area network (LAN), wide area network (WAN), the Internet, etc. The network 106 may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network 106 may include a variety of network devices including, for example, routers, bridges, servers, computing devices, storage devices, etc.

Figure 2:
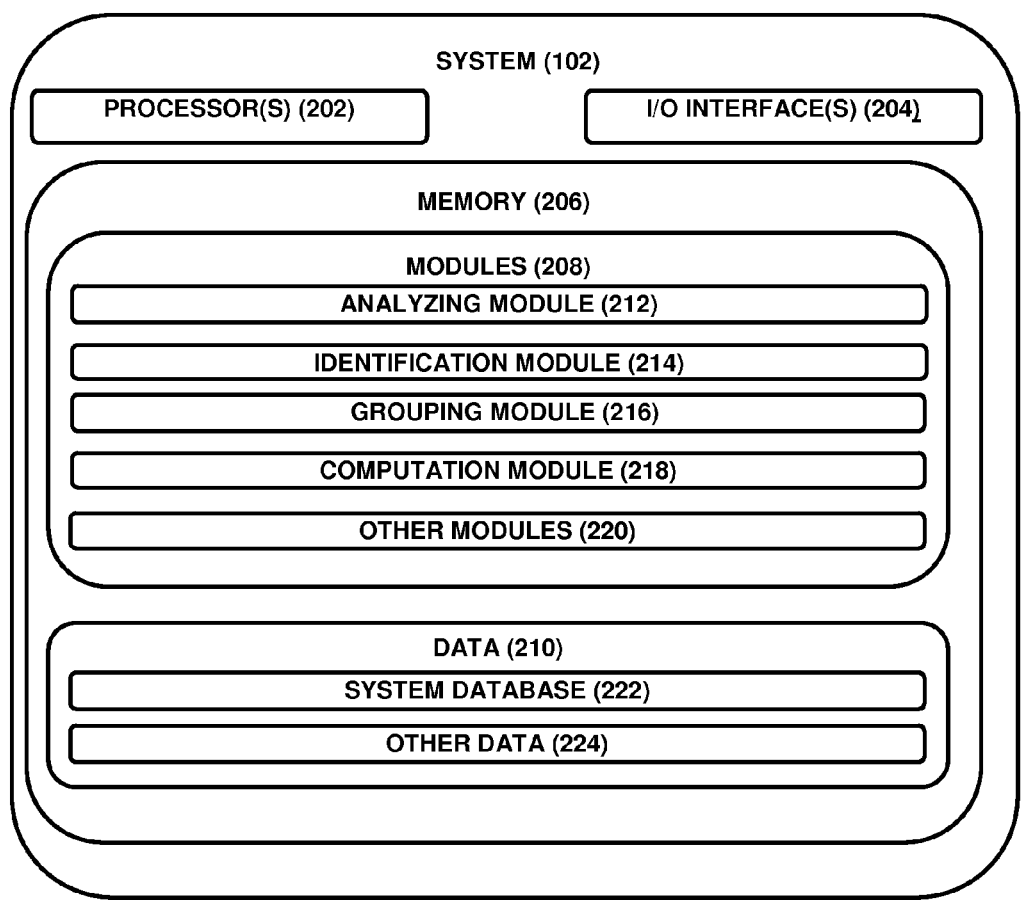
FIG. 2 illustrates an exemplary system for grouping warnings generated based on static analysis, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, such as a web interface, a graphical user interface, etc. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks (e.g., LAN, cable networks, etc.) and wireless networks (e.g., WLAN, cellular networks, or satellite networks). The I/O interface 204 may include one or more ports for connecting a number of devices to one another or to another server.

The memory 206 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, etc., which perform particular tasks or implement particular abstract data types. In one embodiment, the modules 208 may include an analyzing module 212, an identification module 214, a grouping module 216, a computation module 218, and other modules 220. The other modules 220 may include programs or coded instructions that supplement applications and functions of the system 102.

The data 210 may serve as a repository for storing data processed, received, and/or generated by one or more of the modules. The data 210 may also include a system database 222, and other data 224. The other data 224 may include data generated as a result of the execution of one or more modules in the other module 220.

In some embodiments, a user may use the client device 104 to access the system 102 via the I/O interface 204. The user may register using the I/O interface 204 in order to use the system 102. The system 102 will be further described in detail in connection with FIGS. 3 and 4. The system 102 may be configured to provide a grouping of warnings generated based on static analysis of an application program. To provide the grouping of warnings generated during static analysis of the application program, the system 102 may analyze the application program in order to generate the warnings. For example, the application program may be analyzed by the analyzing module 212.

Further, the identification module 214 may be configured to identify similar warnings from the plurality of warnings. The similar warnings may have structurally and semantically similar expressions of interest (EOI). Further, the similar warnings may be reachable from one another. Variables of the EOI of the similar warnings may not be modified between program points of the similar warnings. And values evaluated by EOI of at least one warning of the similar warnings may comprise values from the EOI of other warnings of the similar warnings.

In some embodiments, the similar warnings are both semantically and structurally similar because EOIs that are only structurally similar may evaluate to different values. For example, consider two EOIs such as "v+a" (where "a" is a local variable) and "v+a" (where "a" is a global variable). The above two exemplary EOIs may not be treated as similar EOIs because they evaluate to different values and hence the warnings generated with the above mentioned EOI cannot be considered as similar. As another example, the warnings generated based on EOIs such as "v+1" and "1+v" may not be treated as similar EOIs because these EOIs have different structures even though they may evaluate to the same values. To identify the similar warnings, in some embodiments, the warnings are required to be both structurally and semantically similar.

The following lines of code illustrate an exemplary program (A):

```
#define SIZE 10
intrColors[SIZE], gColors[SIZE], bColors[SIZE];
1. void func(int r, int g, int b)
2. {
3. // Values of 'n' and 'factor' are not known
4. ...
5. factor = getDivFactor( );
6. if((r/factor >rval1) && ...)
7. rColors[n] = r;
8.
9. if((g/factor >gval1) && ...)
10. gColors[n] = g;
11.
12. if((b/factor >bval1) && ...)
13. bColors[n] = b;
14.
15. gradient = getGradient(rColors[n],gColors[n],bColors[n]);
16. ...
17. }
```

In the above exemplary program (A), three Zero Division (ZD) and six Array Index Out of Bound (AIOB) warnings may exist because, respectively, the values of denominator "factor" and array index "n" may be statically unknown. Notations $ZD_n$ and $AIOB_n$ may be used to denote the ZD and AIOB points, respectively, at a line "n." In case more than one such points exist at a single line, the points in the program may be differentiated based on the positions of the points (e.g., positions from left to right) and may be presented as a prefixed superscript. For example, a first and a second AIOB points from line 15 can be denoted as $^1AIOB_{15}$ and $^2AIOB_{15}$ respectively. In the above exemplary program (A), all ZD warnings are similar warnings in themselves because the ZD warnings have the same denominator expression "factor" and the value of the denominator expression "factor" is not modified between $ZD_6$ and $ZD_{12}$ points. Moreover, in the above example, only the denominator expressions may be considered as the EOIs because the denominator expression is sufficient for reviewing any given ZD warning point by checking if it may lead to evaluation of the value "0."

Further, in some embodiments, the grouping module 216 may be configured to form one or more groups of the warnings such that each group of the one or more groups comprises the similar warnings. In the above exemplary program (A), the ZD warnings may be grouped together because the ZD warnings are similar warnings. For a single verification property of the application program, the system 102 may implement grouping of the similar warnings generated by a static analysis.

Further, the computation module 218 may be configured to compute a representative warning from each group of the similar warnings, such that the warnings other than the representative warning in the group of the similar warnings follow a review judgment of the representative warning. During a review of the representative warning, finding the representative warning as safe may represent the review of the similar warnings other than the representative warnings in the same group. If the representative warning is found unsafe, some or all of the similar warnings in the same group as that of the representative warning may thus require individual review. The computation module 218 may further perform computation of must reaching expressions (MREs) to determine the representative warning from each group in a forward-flow-of-information computation. The computation module 218 may also perform computation of MREs to determine the representative warning from each group in a backward-flow-of-information computation. The representative warning may also be denoted as a leader warning (LW) and the warnings other than the representative warning in each group may be denoted as follower warnings (FW). In the above exemplary program (A), from the group of the ZD warnings, $ZD_6$ may be safely chosen as the LW because other warnings are observed to follow the review judgment of the LW.

A warning from the group of the similar warnings may be selected as LW if its EOI is reaching (must reaching expression—MRE), or live (must live expression—MLE), to other warning points from the same group. For example, for any warning "W," if there are one or more MREs and/or MLEs from some other warning(s) that are identified as similar to warning W, then warning W is an FW. If there is no MRE or MLE from some other warning(s) that are identified as similar to warning W, then warning W is a LW.

Referring still to the above exemplary program (A), the $ZD_6$ warning may be chosen as the LW because the denominator expression of $ZD_6$ is reaching at later ZD points. All paths to $ZD_9$ and $ZD_{12}$ also include $ZD_6$ and denominator variable "factor" is not modified in between. Thus, the values evaluated by denominators of $ZD_9$ and $ZD_{12}$ (i.e., FWs in this embodiment) may be contained in the values evaluated by the denominator of $ZD_6$. If the $ZD_6$ warning is found to be safe after the review, then the FWs may also be safe. If the $ZD_6$ warning is found to be unsafe, then the FWs may also be unsafe. In some embodiments, if a LW is found to be unsafe, the FWs may not necessarily be observed as unsafe because some additional checks may be applied to prevent the FWs from being unsafe.

In some embodiments, the probability of finding the warning generated as defective and/or unsafe may be low. Accordingly, based on the given review judgment relationship between the LW and the FWs and the low probability of finding the warnings generated as defective and/or unsafe, reviewing only the leader warnings (LWs) may be considered sufficient. As a result, the disclosed grouping of similar warnings may help the users to avoid from paying attention to the FWs during review, and may lead to a reduction in review efforts.

Referring still to the above exemplary program (A), six AIOB points in the program may be AIOB warnings because their index values cannot be known statically. The AIOB warnings may also be similar warnings because indexes of the AIOB warnings are the same and are not modified between lines 7 and 16 of the exemplary program (A). Any two of the AIOB warnings may be similar warnings if related array indexes and array sizes of the two AIOB warnings are the same. In some embodiments, only the array index may be considered as the EOI in the context of verification of the AIOB warnings. And the array being indexed may be excluded from the EOI because it may be only required to obtain the bound (e.g., the array size) for the index check. The shifting of the focus from arrays to array-sizes may help to identify the maximum possible number of warnings as similar warnings. If the array is also treated as a part of an EOI, then the warnings $^1AIOB_{15}$ and $^2AIOB_{15}$ may not be identified as the similar warnings.

The AIOB warnings identified as similar warnings may be grouped together so that they may be viewed as a single warning. For example, with respect to the AIOB warnings that are grouped together, $AIOB_7$ may not be selected as the LW because the index of $AIOB_7$ is not reaching to other AIOB points. And with this selection, the required guarantee of review judgment relationship may not be given. Similarly the $AIOB_9$ and $AIOB_{12}$ warnings may not be selected as the LW. However, the $^1AIOB_{15}$ or any other warning from the same line may be selected as the LW of the group because this selection may guarantee the required review judgment relationship between LW and FWs. The values evaluated by the index of $^1AIOB_{15}$ may contain the values evaluated by the indexes of other AIOB warnings. This may be ensured by observing that, for example, the index (n) of $^1AIOB_{15}$ may be alive at earlier AIOB points, i.e., any path passing through the FWs computed also passes through the $^1AIOB_{15}$ (i.e., the LW) and the index "n" is not modified in between. The review of the warning $^1AIOB_{15}$ may represent or ensure the review of the other warnings in the group formed.

While the above exemplary program (A) may only consider EOIs (e.g., factor for ZD and "n" for AIOB) with single variables, the warnings that are identified as the similar warnings may be grouped when their EOIs are complex expressions (e.g., (var1+var2−var3) or (arr1[0]+arr[i])). The grouping of warnings identified as the similar warnings at an application level may reduce the number of generated warnings, avoid multiple verification cycles during a process of review, and reduce review efforts.

With reference to FIG. 2, the computation module 218 may compute at least one of MREs and MLEs for the determination of the Leader Warnings. The MRE may be defined as follows. For example, an expression "e" from a program point $P_E$ may be a MRE at a program point P, if every path coming to the program point P also comes through $P_E$ and no path segment between $P_E$ and P contains an l-value occurrence of any of the r-value(s) of the expression "e". That is, $P_E$ precedes P and the values evaluated by the expression "e" at $P_E$ contains the values of the expression "e" if it is evaluated at program point P. Examples of MREs from the above exemplary program (A) may include the denominator of $ZD_6$ and the denominator of $ZD_9$. The denominator of $ZD_6$ may be an MRE at $ZD_9$ and $ZD_{12}$, as each path to $ZD_9$ and $ZD_{12}$ is coming through $ZD_6$ and the variable "factor" is not modified in between. The denominator of $ZD_9$ may be an MRE at $ZD_{12}$ but cannot be an MRE at $ZD_6$, as $ZD_9$ does not precede the $ZD_6$ The index "n" of $AIOB_7$ (or $AIOB_{10}$, $AIOB_{13}$) may not an MRE at any other AIOB points because there may exist a path that does not include the $AIOB_7$, $AIOB_{10}$, or $AIOB_{13}$.

Further, the MREs may be efficiently computed by using a data flow analysis (DFA). A DFA may gather flow-information as a value or a set of values at various program points in an application. A function summary based approach may be used for the DFA to compute the required MREs in a context and flow sensitive manner. The below presented data flow formulization for computation of MREs may depict a forward flow analysis and may target one verification function at a time. For example, the required MREs for grouping the ZD warnings and the AIOB warnings maybe required to be computed separately. Unlike available expressions, the EOIs may be actual expressions as they are in an IR representation (e.g., an abstract syntax tree that is built for the input source program). The below data flow equations are illustrated for a node "n" in a control flow graph (CFG).

$$In_n = \begin{cases} \emptyset & n \text{ is start of function} \\ \bigcap_{p \in pred(n)} Out_p & \text{otherwise} \end{cases}$$

$$Out_n = (Gen_n + In_n) - Kill_n(Gen_n + In_n)$$

$$Gen_n = \begin{cases} \{e\} & n \text{ is a warning point and } e \text{ is its } EOI \\ \emptyset & \text{otherwise} \end{cases}$$

$$Kill_n(X) = \begin{cases} killInfo(X, n) & n \text{ modifies atleast one variable} \\ \emptyset & \text{no variable is modified by } n \end{cases}$$

$$killInfo(X, n) = e\{e \in X \mid (usedVars(e) \cap modifedVars(n)) \neq \emptyset\}$$

$$usedVars(e) = r\text{-values from expression } e$$

$$modifiedVars(n) = l\text{-values from program statement } n$$

In some embodiments, in connection to above equations, boundary value=$\emptyset$. Initialization/Top=set of all EOIs from all warnings since meet operation is intersection. The partial order is reflexive, transitive, and anti-symmetric. The meet operation is commutative, associative, and idempotent.

The equation for "Out$_n$" may be deviated from a standard DFA equation as the kill component is computed from Gen$_n$+In$_n$. This change may be incorporated as the MREs may get generated and killed at the same program points (e.g., "val=arr[val]"). The index "val" may not be expected to be flowing out as an MRE after this program point.

In some embodiments, to compute the MREs more efficiently, the following points may be considered. For example, consideration may be given to program points with analysis warnings only. EOIs identified as safe or unsafe may be ignored from the computation of MREs. The EOIs that include function calls and volatile variables may be ignored from the computation of MREs, because in the presence of such EOIs, the required guarantee in the review judgment of the so computed LW and FWs may not be given. The information of modified variables should be computed as a separate "May-Kill/Modified" data flow problem. When arrays are included in computing killed information, conservative approaches should be taken. Expressions such as (arr[0]+b) should not be reached after the "arr[i]=n" program point, when the value of "i" is unknown.

In some embodiments, the must live expression (MLEs) may be defined as follows. An expression "e" from the program point P$_E$ may be an MLE at a program point P, if every path passing through the program point P also passes through the program point P$_E$ and no path segment between P and P$_E$ contains an l-value occurrence of any of the r-value(s) of "e." That is, the program point P precedes the program point P$_E$ and the values evaluated by "e" at the program point P$_E$ contains the values of "e" if it is evaluated at the program point P. Examples of MLEs from the above exemplary program (A) may include the index of n of $^1$AIOB$_{15}$ and the indices from warnings at line 15. The index of n of $^1$AIOB$_{15}$ is a MLE at AIOB$_7$ as all paths from AIOB$_7$ also pass through $^1$AIOB$_{15}$ and their index n is not modified in between. Similarly, the indices from warnings at line 15 will be MLEsatAIOB$_7$, AIOB$_{10}$ and AIOB$_{13}$. The index of AIOB$_{13}$ is not a MLE at AIOB$_7$ and AIOB$_{10}$ warnings, because there may exist a path which passes through AIOB$_7$ and AIOB$_{10}$ but does not pass through AIOB$_{13}$.

Further, the MLEs may be efficiently computed by using the DFA. The formulization for computation of MLEs may be substantially the same as that for computation of MREs, with some differences in the equation of In$_n$. The differences may be incorporated to consider the backward flow of information computation and is shown below.

$$In_n = \begin{cases} \emptyset & n \text{ is end of function} \\ \bigcap_{s \in succ(n)} Out_s & \text{otherwise} \end{cases}$$

In some embodiments, the considerations as described above corresponding to the efficient computation of MRES may also be the same for the computation of the MLEs.

With reference to FIG. 2, the computation module 218 may further implement optimization in the DFA in order to avoid unnecessary MRE/MLE identifications. The formulated DFA shows that the MRE and/or MLE may be generated at each warning point. During a DFA solving, if a warning point observes flowing-in of MRE/MLE from some other similar warnings, the MRE/MLE for the current warning may not be required to be generated. The generation of such MRE/MLE may be avoided for efficiency purposes, because such warning may be a FW and this computation may not add any value. This may not only reduce the data that is computed in the DFA but also expedite the computation of LWs and FWs computation.

At any warning W, if no MRE/MLE from any other similar warning points exists, then the warning W is a LW. Initially, each warning generated may be viewed as a LW having its own group without any FW. To obtain optimal benefit from the grouping of the warnings, the number of the LWs should be minimized. The number of the LWs may be reduced by associating these initial LWs with some other LWs, i.e., by converting them to FWs. After this type of grouping, every warning belongs to a single group and therefore cannot be an LW and an FW at the same time. As a result, the group of the similar warnings may contain one LW and any number of FWs (including zero FW).

As an example, notation LW$_O$ may be used to denote a set of LWs computed after the grouping of the similar warnings. In one embodiment, the computation module 218 may implement a graph-based approach to compute the required LW$_O$. For example, each generated warning may be represented as a tree having only one node, which denotes the warning, such that, initially, the number of trees will be equal to the number of warnings that are generated. At a warning point W, the MREs/MLEs may be computed and, for each MRE/MLE that is generated from a warning W$_L$, a directed edge may be added from vertex corresponding to the warning W$_L$ to vertex corresponding to the warning W. Such an edge may need to be added if the EOIs (and other required information such as array sizes) of the warning W and the warning W$_L$ are similar, and if there is no incoming edge to the vertex corresponding to the warning W$_L$.

The first condition (i.e., if the EOIs—and other required information such as array sizes—of the warning W and the warning W$_L$ are similar) may be required to associate the warnings identified as the similar warnings. The second condition (i.e., if there is no incoming edge to the vertex corresponding to the warning W$_L$) may be required to avoid the addition of redundant edges as both the warnings W and W$_L$ are guaranteed to be FWs. When W$_L$ has an incoming edge, it may not be a LW. After the additions of the edges are completed according to the MRE and MLE results, the resultant trees may depict the LWs and their associated FWs. In some embodiments, each tree may be a group of warnings that are identified as similar warnings. The vertex without an incoming edge maybe a LW of the group and the vertices that can be traversed from the LW maybe the FWs of the group. Thus, the number of groups formed may correspond to the number of trees. For efficiency purpose, the LWs (e.g., the LW$_O$) may be computed using MREs and then the MLEs are computed for these LWs only. Later using the computed MLEs, the earlier obtained LW$_O$ as per MREs may be refined further to get the lesser LWs.

Figure 3:
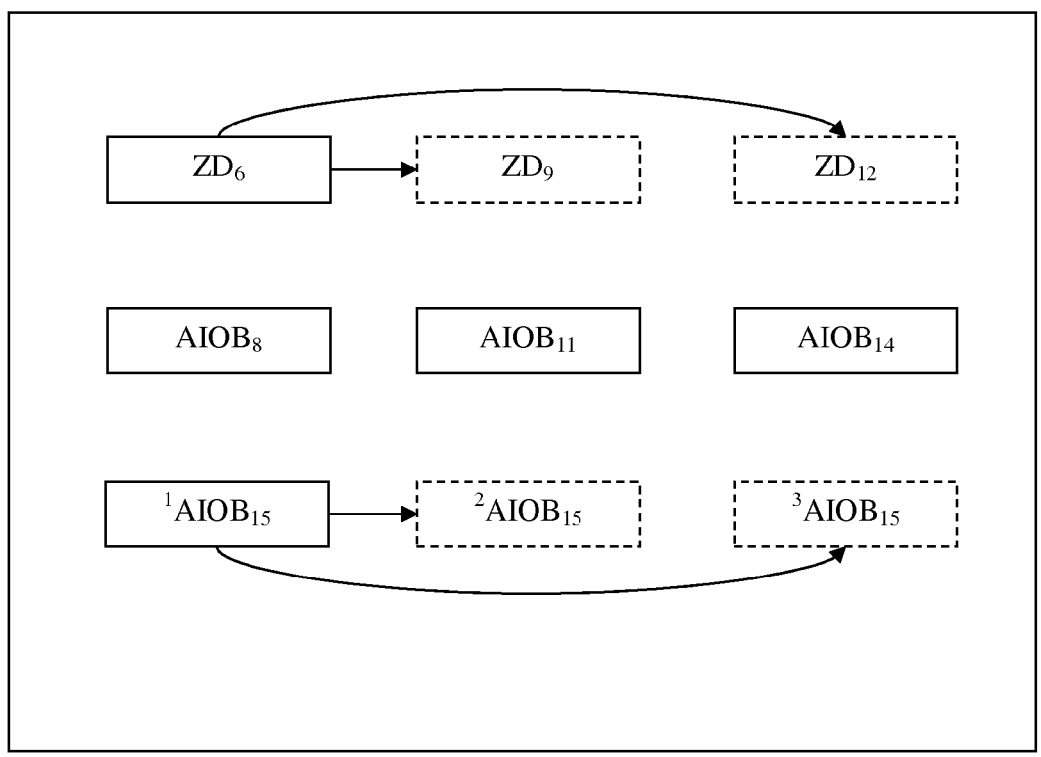
FIG. 3 illustrates an exemplary method for determining a set of leader warnings using must reaching expressions (MREs), in accordance with an embodiment of the present subject matter.

As an example, with reference to the exemplary program (A), the vertex in a forest (e.g., a forest that include one or more trees) may be denoted corresponding to any warning with the same notation that is used to denote the warning. Initially, all these vertices may not have any incoming or outgoing edges. The directed edges may be added as described using the results of MREs for ZD and AIOB. The forest obtained is shown in FIG. 3. As shown in FIG. 3, the index of ZD$_6$ is MRE to ZD$_9$ and ZD$_{12}$, and therefore there are respective edges from ZD$_6$ to ZD$_9$ and from ZD$_6$ to ZD$_{12}$. Additionally, even though the index of ZD$_9$ is MRE to ZD$_{12}$, the respective edge may not be added as the vertex for ZD$_9$ has an incoming edge (i.e., in conforming to the second condition).

Figure 4:
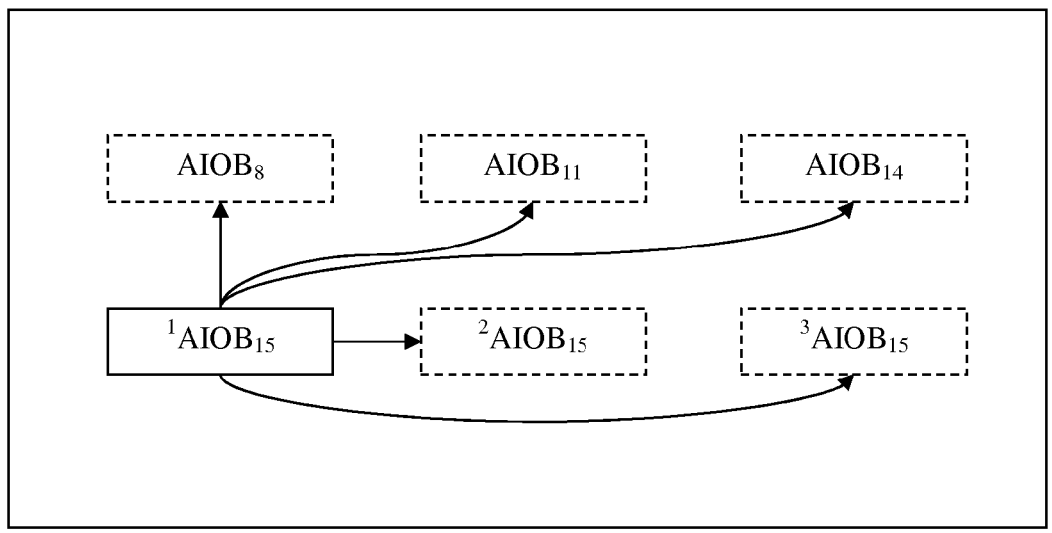
FIG. 4 illustrates an exemplary method for refining a set of leader warnings using must live expressions (MLEs), in accordance with an embodiment of the present subject matter.

The forest as shown in FIG. 3 may represent the $LW_O$ as expected for ZD with $ZD_6$ as a single LW and $ZD_9\&ZD_{12}$ as the FWs. The $LW_O$ for AIOB may not be as expected because it represents four warnings as LWs for review instead of one warning. This is because, the MREs may not be always sufficient to compute the expected $LW_O$, and refinement may be required using MLEs. The MLEs may be computed only for the LWs, which are obtained using MREs, and the edges may be added according to the corresponding computation results. The refined $LW_O$, which may be obtained using MLEs, is shown in FIG. 4. FIG. 4 illustrates a single AIOB warning as a LW.

In some embodiments, the system 102 may provide grouping of a plurality of warnings generated based on a static analysis using the modification points based grouping (MPG). The analyzing module 212 may be configured to analyze the application program to generate the plurality of warnings. Further, the identification module 214 may be configured to identify the similar warnings from the plurality of warnings, such that the expression of interests (EOIs) of the similar warnings may have the same operators appearing in the same order and EOI variables. The EOI variables may be related by their position in the EOIs, and may get values from the same modification points in the application program. The grouping module 216 may be further configured to form one or more groups of the plurality of warnings. Each group of the warnings may comprise the similar warnings. A review of a warning of the similar warnings in the group may represent or ensure the review of the other similar warnings in the group, if the warning reviewed is found safe by considering values provided by the modification points of the EOI variables. Further, the grouping module 214 may associate and report the modification points for each MPG group. The associated modification points may be the modification points of the EOI variables from the similar warnings in the group.

The grouping module 216 may further perform computation of reaching definitions to form the one or more groups of the similar warnings. If the warning from the group is found to be safe on the review based on the EOI variable values from their associated modification points, the other warnings from the same group may not be required to be reviewed. If, after the review, a selected warning from the group is not found to be safe, each warning from the group may be required to be reviewed individually.

The following lines of code illustrate an exemplary program (B):

```
intarr[10];
void func(constint* baseAddr, constint* currPtr)
{ // val gets assignment of values from 0 to 9.
        intval = currPtr − baseAddr;
        switch (switchVar)
        {
                case 1: func1(val); break;
                case 2: func2(val); break;
                case 3: func3(val); break;
                default: break;
        }
}
void func1(intp1)
{
        if(...) arr[p1] = ...;
        else if (...) arr[p1] = ...;
}
void func2(intp2)
{
        if(...) arr[p2] = ...;
        else if(...) arr[p2] = ...;
}
```

-continued

```
void func3(intp3)
{
        if(...) arr[p3] = ...;
        else if (...) arr[p3] = ...;
}
```

The above exemplary program (B) depicts an example where the value (e.g., 0 to 9) of the val variable may be computed using pointer arithmetic and may be passed to multiple functions for the array index usage. Most static analysis tools may report these AIOB points as warnings, because the values for varmay not be determined statically. The review of each warning may require finding values taken by their respective index variables (p1, p2, p3) and hence may require a manual traversing from the warning point to the definition point of val (e.g., the one with pointer arithmetic). The user may then decide if the warning is safe or unsafe based on these values. As a result, reviewing of all such warnings may require considerable efforts.

In such a scenario, the identification module 214 may identify the warnings, of which EOI variables obtain values from the same modification (or definition) points and the grouping module 216 may group the warnings identified so that the review efforts can be reduced. Along with such modification points, other parameters, from the review perspective, should also match for treating them in a single group. When the EOIs are complex expressions involving multiple variables, the EOIs may be required to observe the same order of operators and the variables related by their positions in these EOIs may be required to find same modification points.

For example, in some embodiments, the array-sizes should also match for grouping the AIOB warnings using MPG. The warnings with their EOIs as v+1, v, and v−1 may not be grouped using MPG because the EOIs differ in structure. The warnings with a+b+c and a+b+c as EOIs may be grouped by using MPG, if each of the variables (a, b, c) obtains values from the same modification points.

As an example, $V_W$ may represent the set of values evaluated by EOI at any MPG grouped warning point. During the review, user may frequently refer to the values of the EOI variables being assigned to at their modification points and may evaluate the EOI under review. $V_M$ may represent the set of values for the same EOI that are evaluated by considering its variables' values obtained from modification points. For any MPG grouped warning, $V_W$ may be less than or equal to $V_M$. If, based on $V_M$, the user observes that any MPG grouped warning is safe, the safety of all of the grouped warnings may be ensured. In this scenario, the review of the other MPG grouped warnings individually may be redundant and maybe avoided. If the warning cannot be identified as safe based on $V_M$, some or all MPG grouped warnings may be required to be reviewed individually by the user.

The AIOB warnings in the above exemplary program (b) may be grouped together as per MPG, because their array sizes are equal and the indexes obtain values from the same modification point. During the review, the user may find the required values for any index variable based on the reported modification point of val. For example, the user may observe that the values of variable val are within an array bound (e.g., [0 . . . 9]) and therefore the index maybe within the bound. As a result, a selected warning from a MPG group of the warnings maybe found to be safe and reviewing of other warnings may not be required.

In one embodiment, the system 102 may be configured to perform the grouping of the warnings based on a MPG for the LWs computed by the computation module 218. The FWs from each group may be ignored if the review judgment of the FWs is the same as that of the LW. The grouping of LWs based on the MPG may result in a higher efficiency and may further reduce the efforts required for manual review of the warnings.

Figure 5:
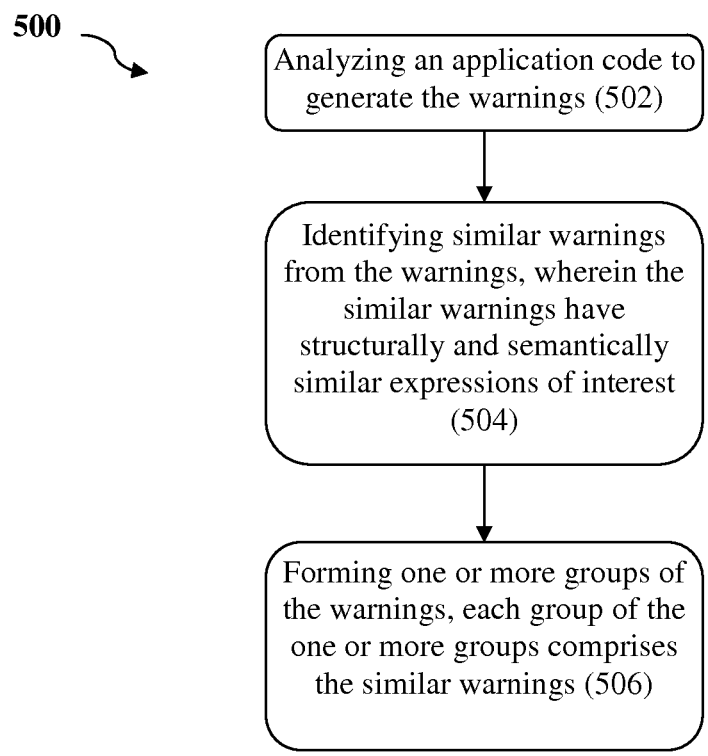
FIG. 5 illustrates an exemplary method for grouping of warnings generated based on static analysis, in accordance with an embodiment of the present subject matter.

FIG. 5 illustrates an exemplary method 500 for providing grouping of one or more warnings generated based on a static analysis, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. In a distributed computing environment, computer executable instructions may be located in both local and remote computer storage media, including, for example, memory storage devices.

The order in which the method 500 is described is not intended to be construed as a limitation, and any of the described steps of the method 500 can be combined in any order to implement the method 500 or alternate methods. Additionally, individual steps may be deleted from the method 500 without departing from the spirit and scope of the subject matter described herein. Furthermore, the method maybe implemented in any suitable hardware, software, firmware, or combination thereof. However, for ease of explanation, in the embodiments described below, the method 500 may be considered to be implemented in the above described system 102.

As shown in FIG. 5, at step 502, an application program may be analyzed. In one embodiment, the application program may be analyzed to generate the warnings by the analyzing module 212. At step 504, the similar warnings may be identified. In one embodiment, the similar warnings may be identified by the identification module 214. At step 506, one or more groups of the warnings may be formed. Each group of the one or more groups may comprise the similar warnings. In one embodiment, the one or more groups may be formed by the grouping module 216.

While methods and systems for providing grouping of one or more warnings generated based on a static analysis are described in language specific to certain structural features and/or methods, it is appreciated that the appended claims are not necessarily limited to the specific features or methods described. Rather, the specific features and methods are disclosed as examples of implementations for providing grouping of one or more warnings generated based on a static analysis.

We claim:

1. A method for grouping a plurality of warnings generated based on a static analysis of an application program, the method comprising:
    analyzing, by one or more processors executing programmed instructions stored in a memory, the application program to generate the plurality of warnings;
    identifying, by the one or more processors, one or more similar warnings based on the plurality of warnings, the one or more similar warnings having structurally and semantically similar expressions of interest (EOIs);
    generating, by the one or more processors, one or more groups of warnings based on the plurality of warnings, the one or more groups of warnings including one or more of corresponding identified similar warnings; and
    grouping said plurality of warnings, wherein at least one review of the warning in at least one group indicates a review of one or more similar warnings, wherein the one or more similar warnings is different from a warning reviewed earlier, and wherein grouping of the one or more similar warnings are generated by the static analysis comprising of:
    computing a plurality of must reaching expressions (MREs) in a forward-flow-of-information computation, and
    computing a plurality of must live expressions (MLEs) in a backward-flow-of-information computation.

2. The method of claim 1, wherein the similar warnings are reachable from one another, wherein variables of the EOI associated with the similar warnings are kept from being modified between program points associated with the similar warnings, and wherein values that are evaluated by the EOI of at least one warning of the similar warnings comprise values from the EOI associated with other warnings of the similar warnings.

3. The method of claim 1, wherein generating the one or more groups of warning corresponds to a single verification property of the application program.

4. A system for grouping a plurality of warnings generated based on a static analysis of an application program, the system comprising:
    one or more processors; and
    a memory storing processor-executable instructions that, when executed by the one or more processors, configure the one or more processors to:
    analyze the application program to generate the plurality of warnings;
    identify one or more similar warnings based on the plurality of warnings, the one or more similar warnings having structurally and semantically similar expressions of interest (EOIs);
    generate one or more groups of warnings based on the plurality of warnings, the one or more groups of warnings including one or more of corresponding identified similar warnings, and
    group said plurality of warnings, wherein at least one review of the warning at least one group indicates a review of one or more similar warnings, wherein the one or more similar warnings is different from a warning reviewed earlier, and wherein grouping of the one or more similar warnings are generated by a static analysis comprising of:
    computing a plurality of must reaching expressions (MREs) in a forward-flow-of-information computation, and
    computing a plurality of must live expressions (MLEs) in a backward-flow-of-information computation.

5. The system of claim 4, wherein the similar warnings are reachable from one another, wherein variables of the EOI associated with the similar warnings are kept from being modified between program points associated with the similar warnings, and wherein values that are evaluated by the EOI of at least one warning of the similar warnings comprise values from the EOI associated with other warnings of the similar warnings.

6. The system of claim 4, wherein the instructions to generate the one or more groups of warning corresponds to a single verification property of the application program.

* * * * *